United States Patent
Keller et al.

(10) Patent No.: US 7,792,105 B2
(45) Date of Patent: Sep. 7, 2010

(54) BROADCAST IN POINT-TO-POINT ORIENTED PACKET-SWITCHED NETWORKS

(75) Inventors: Ralf Keller, Würselen (DE); Thorsten Lohmar, Aachen (DE); Frank Hundscheidt, Kerkrade (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1579 days.

(21) Appl. No.: 10/497,581

(22) PCT Filed: Dec. 10, 2002

(86) PCT No.: PCT/EP02/13993

§ 371 (c)(1),
(2), (4) Date: Jun. 3, 2004

(87) PCT Pub. No.: WO03/051000

PCT Pub. Date: Jun. 19, 2003

(65) Prior Publication Data

US 2005/0018678 A1   Jan. 27, 2005

(30) Foreign Application Priority Data

Dec. 13, 2001   (EP) .................................. 01129718

(51) Int. Cl.
*H04L 12/28* (2006.01)
*H04L 12/56* (2006.01)
*H04J 3/26* (2006.01)

(52) U.S. Cl. ....................................... 370/390; 370/432
(58) Field of Classification Search .................. 370/390, 370/432, 408
See application file for complete search history.

(56) References Cited

U.S. PATENT DOCUMENTS

| 6,466,552 | B1 * | 10/2002 | Haumont ..................... 370/310 |
| 6,876,636 | B2 * | 4/2005 | Sinnarajah et al. .......... 370/312 |
| 6,912,402 | B1 * | 6/2005 | Haumont et al. ............ 455/519 |
| 7,158,801 | B1 * | 1/2007 | Muhonen .................... 455/503 |
| 7,184,789 | B2 * | 2/2007 | Leung et al. ................. 455/519 |
| 2002/0085537 | A1 * | 7/2002 | Carlsson et al. ............. 370/352 |
| 2002/0131407 | A1 * | 9/2002 | Muhonen .................... 370/352 |
| 2003/0063591 | A1 * | 4/2003 | Leung et al. ................ 370/338 |

(Continued)

FOREIGN PATENT DOCUMENTS

EP   1 071 296 A   1/2001

(Continued)

OTHER PUBLICATIONS

European Patent Office, International Search Report for PCT/EP02/13993, dated Jul. 2, 2003.

*Primary Examiner*—Chirag G Shah
*Assistant Examiner*—Suk Jin Kang
(74) *Attorney, Agent, or Firm*—Roger S. Burleigh

(57) ABSTRACT

The invention relates to a method, a broadcast management centre, a router, a host and a system for performing broadcast in a point-to-point oriented packet-switched telecommunication network. The basic idea is to use multicast for parts of the transmission within said telecommunication network. The multicast technique is used to send broadcast data to a geographical broadcast group to which a network node belongs. The network nodes are configured to a certain geographical broadcast group by the broadcast management centre.

14 Claims, 2 Drawing Sheets

U.S. PATENT DOCUMENTS

Figure 1:
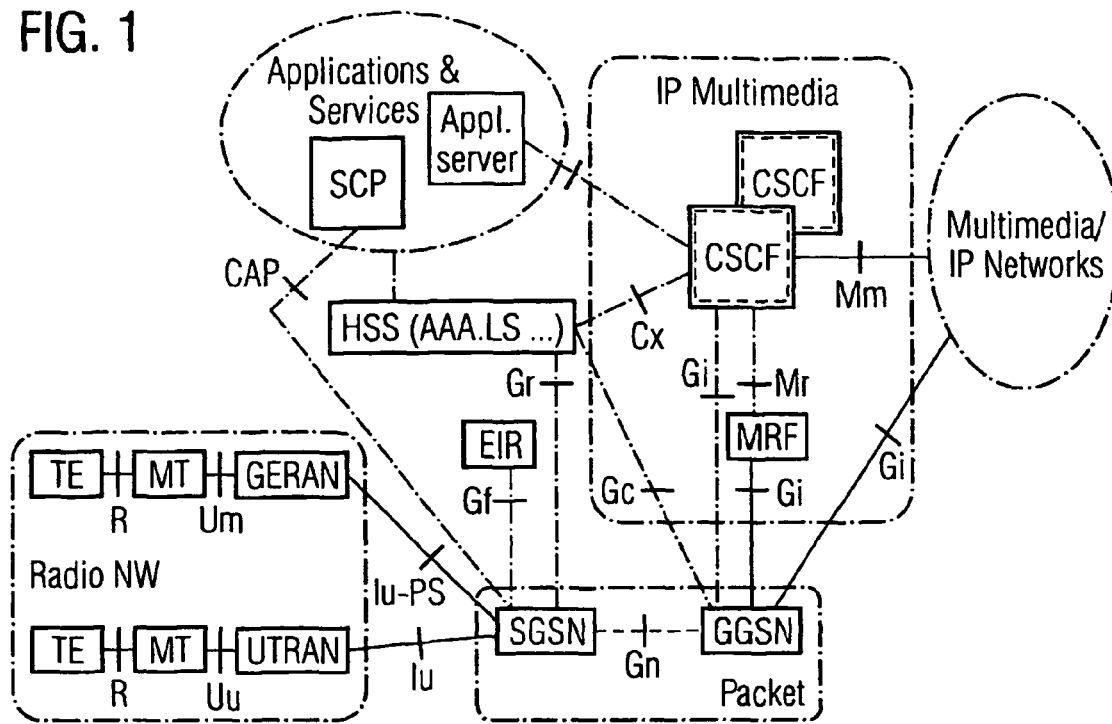

| | | | | |
|---|---|---|---|---|
| 2003/0086423 A1* | 5/2003 | Hsu | ............................ | 370/390 |
| 2003/0134653 A1* | 7/2003 | Sarkkinen et al. | ............ | 455/517 |
| 2004/0073928 A1* | 4/2004 | Alakoski et al. | ............... | 725/62 |
| 2004/0087319 A1* | 5/2004 | Bos et al. | ..................... | 455/458 |
| 2006/0166653 A1* | 7/2006 | Xu et al. | ................... | 455/412.2 |

FOREIGN PATENT DOCUMENTS

WO     WO 99 59355 A     11/1999

* cited by examiner

BROADCAST IN POINT-TO-POINT ORIENTED PACKET-SWITCHED NETWORKS

TECHNICAL FIELD OF THE INVENTION

The present invention relates to a method, broadcast management centre, router, host and system for performing broadcast in a point-to-point oriented packet-switched telecommunication network.

BACKGROUND

Broadcast allows the possibility of addressing a packet to all destinations by using a special code in the address field. When a packet with this code is transmitted, it is received and processed by every user on the network. Upon receiving a packet and if a user is not intended to receive the message, it discards the received packets. In contrast to this the point-to-point communication means the sending of a message from a single sender to a single receiver. Some broadcast systems also supports transmission to a subset of the users, the so-called multicasting. Multicasting is a service that permits sources to send a single copy of the same data to an address that causes the data to be delivered to multiple recipients, who are registered to a multicast group. Therefore multicasting is a form of broadcasting. The difference is that in case of broadcasting the user is not requested to register to any group, the message is distributed to all users.

In broadcasting and also in multicasting only one copy of a message passes over any link in a network and copies of the message are made only where paths diverge. From the network perspective, broadcast dramatically reduces overall bandwidth consumption, since the data is replicated in the network at appropriate points rather than in the end-systems. Further a server, which is sending broadcast messages, needs to manage only one session.

In the following the registration procedure of Internet Protocol multicast will be handled in more details.

In case the multicast is used in Internet Protocol IP network then it is called IP multicast. Among other features characterising the IP multicast, a specific form of addressing is applied using the existing IP address, like the so-called D-address in IP version 4.

Within the IP multicast the membership of a multicast session group is dynamic which means that hosts may join and leave groups at any time. In order to allow hosts on networks to indicate whether they wish to join or leave a particular multicast group there is a protocol called the Internet Group Message Protocol IGMP. Thus this protocol lets the system know which hosts currently belong to which multicast group. This information is required by the multicast routers to know which multicast data packet is to be forwarded onto which interface.

The IGMP is a part of the IP layer and the IGMP messages are transmitted in IP data packets. The version 1 of IGMP is described in RFC 1112 "Host extensions for IP multicasting" S. E. Deering, Aug. 1, 1989, RFC 2236 "Internet Group Management Protocol, Version 2" W. Fenner, November 1997 describes the version 2. The IGMP has been developed for IP version 4. In Internet Protocol IP version 6 there is a similar protocol called Multicast Listener Discovery MLD, which is used for the same purpose as the IGMP. MLD provides more functionality as IGMP. The description of the first version of MLD can be found in RFC 2710 "Multicast Listener Discovery (MLD) for IPv6" S. Deering, W. Fenner, B. Haberman, October 1999. However the messages used in MLD correspond to the IGMP messages. In the following the IGMP will be used as an example. Although this should not be restricted to the IGMP, the functionality of the invention is also given by usage of MLD.

In principle the IGMP uses two basic messages to fulfil its tasks, the membership report and the membership query message and the following rules are applied.

A multicast router sends a membership query at regular intervals to see if any hosts still belong to any group. The router must send one query out each interface. A host responds to a membership query by sending one membership report for each group that still contains at least one process. A host joins a group sending also the membership report.

Using the information received by applying the report and the query messages a table with its interfaces having at least one host in a multicast group is established. After reception of the multicast data, the router forwards the data out on those interfaces, which have at least one member.

With IP multicast receivers do not need to know who or where the senders are to receive traffic from them and the senders never need to know who the receivers are Neither senders nor receivers need to care about the network topology as the network optimises delivery. The distribution of the information via the IP multicast is performed on the base of a hierarchical connection of the hosts, like for example a multicast delivery tree. Several algorithms have been proposed for building multicast distribution trees, like for example spanning trees, shared-trees, source-based trees, and core-based trees. The descriptions of the corresponding algorithms can be found in "IP telephony: Packet-based multimedia communications systems" O. Hersent, D. Gurle, D. Petit, Addison-Wesley, Wesley, Harlow, 2000. After the establishment of the multicast delivery tree, the distribution of the information is done by the IP multicast routing protocols. The detailed description of the corresponding IP multicast routing protocols can be also found in the above-mentioned document.

In order to explain the problem occurring by introduction of broadcast in a point-to-point oriented packet-switched telecommunication system in the following an overview of the architecture of the General Packet Radio System GPRS network is given.

The GPRS is the packet-switched enhancement of the Global System for Mobile Communication GSM, which is a circuit switched network. It means that the user can be permanently online connected but it has to pay only for the real data transfer. In order to fulfil the new requirements some changes are to be introduced into the GSM. Among other new logical nodes are to be introduced, the Serving GPRS Support Node SGSN and the Gateway GPRS Support Node GGSN. The main functions of the GGSN involve interaction with external IP packet networks providing connections to Internet Service Providers ISPs via the Gi interface. The SGSN serves all GPRS subscribers that are physically located within the geographical SGSN service area. It communicates via the Gn interface, which defines the IP based backbone, with GGSN. The IP based backbone is the restriction of GPRS in that GGSN and SGSN are to be connected in a way that IP is run on top of the technology chosen, meaning that SGSN and GGSN communicate via IP addresses. This restriction applies also for the Iu-PS interface, which is defined between the SGSN and the Radio Network Controller RNC. The RNC manages Radio Access Bearers for user data, the radio network and mobility. The Radio Base Station called also Base Transceiver Station BTS or simply Base Station BS or in 3GPP, Node B, provides the radio resources and communicates with the user equipment over the Uu interface.

A detailed description of the architecture is to be found in 3GPP TS 03.60 V7.5.0 (2001-01) 3$^{rd}$ Generation Partnership Project; Technical Specification Group Services and System Aspects, Digital cellular Telecommunications System (Phase 2+), General Packet Radio Service (GPRS), Service Description, Stage 2 (Release 1998).

Similar nodes and interfaces are also used in the next generation of the wireless networks, Universal Mobile Communication System UMTS as described in 3GPP TS 23.060 V3.6.0 (2001-01) 3$^{rd}$ Generation Partnership Project; Technical Specification Group Services and System Aspects, General Packet Radio Service (GPRS), Service Description, Stage 2 (Release 1999).

In order to distinguish between the functionality of these nodes in UMTS extended names are often used, 3G-SGSN and 3G-GGSN. In the following description it will not be distinguished between the GPRS and UMTS nodes.

Currently broadcast in mobile networks causes some problems. The impacts on the problems have among other things the mobility of the end users and low transmission bandwidth of the mobile network on the air interface. Further the communication in a mobile communication networks like for example in UMTS is a unicast communication. The unicast communication is also called point-to-point communication. In such kind of network, and in particular in the core network, it is not foreseen to perform broadcast or even multicast communication. The group communication is implemented by means of a point-to-point communication having a sender transmitting separately the same packets to each receiver, instead of one packet when broadcasting is used. This means the IP broadcast messages are sent from a router settled in an external IP network, like the Internet to the mobile station via unicast connection, because from the point view of the mobile station the router in the Internet is the first node in which the IP connection terminates and therefore the first node applicable for broadcast. Therefore the broadcast is performed on the application IP layer and the network nodes between the server and the user forward merely the broadcast or multicast messages within the core part of the network without distinguishing between a broadcast message and a unicast message. The existing technology of a point-to-point oriented packet-switched telecommunication network, like UMTS does not foresee the utilisation of efficient broadcast.

Beyond this, broadcast is fine when only several users share a small LAN, but in bigger networks, like UMTS, in which a large number of users are connected by different network nodes the broadcast becomes a problem. In particular in mobile networks sending the broadcast information to all users leads to consume considerable amounts of network bandwidth. Further the user's equipment has to check the received information and in case of irrelevant information it has to discard the received packets. This causes an inefficient utilisation of the network node's resources. However there are many applications, which relay on broadcast for example broadcasting service on demand, video and music programmes, multi-camera angle sport viewing and replay or alternate scenario dramas, which are programs, which continuation depends on the result of voting of the receivers.

Often the applications using broadcast as a form of delivery depend on the geographical location of the user. Not taking geographical location into account means that the broadcast messages are sent to all users independently from the matter whether this message could be interesting for the user.

In general introducing and performing of broadcast in a protocol stack, which is basically point-to-point oriented causes problems, then in such kind of networks a unicast channel is established for performing communication between two nodes.

SUMMARY AND DESCRIPTION OF THE INVENTION

It is an object of the present invention to provide a solution for an efficient introduction and performing of broadcast in a point-to-point oriented packet-switched telecommunication network. In particular it is object of the present invention to make the broadcasting depending on the geographical user location.

The telecommunication network has a set of network nodes, wherein the set comprises a first router and at least one host serving at least one user. The first router can connect said telecommunication network with a further network in case a broadcast capable server is located in the further network. It is also possible to have the broadcast capable server located in the point-to-point oriented packet-switched telecommunication network. Said telecommunication network can of course have further network nodes, like for example further routers responsible for routing the data to the user. In one embodiment, a broadcast management centre configures the network nodes for broadcast provisioning within a geographical broadcast group. The broadcast capable server sends the broadcast data to the first router. A multicast technique on the transport layer is used to route the broadcast data from the first router to the host belonging to the certain geographical broadcast group. The host uses broadcast techniques to send the broadcast data to the at least one user.

The advantage of the multicast technique on the parts of the transmission is a better utilization of the network resources. The broadcast data is not sent to every network node but only to the network nodes registered to the geographical group.

In a preferred embodiment of the invention the geographical broadcast group is defined as a geographical area, which is a part of a Public Land Mobile Network PLMN. This can be for example a country like Nordrheinwestfalen or a city.

The configuration of the network nodes performed by the broadcast management centre can be done directly. With this solution the network nodes belonging to the certain geographical area are addressed directly. This guarantees a fast configuration. However this implies that the broadcast management centre has all required information about the nodes, which are to be configured.

In another embodiment of the invention the configuration performed by the broadcast management centre is done indirectly such that a network node is addressed to establish connection to the further network nodes building the certain geographical area. The advantage is that the broadcast management centre administrates information merely about some network nodes and these nodes have information about further nodes. By applying this architecture the responsibility for configuration is delegated to the network nodes.

In the embodiment, in which the configuration is done indirectly it is advantageous to send a message to the network nodes, which are to be configured and the nodes register to the corresponding geographical group. The registration can be done by means of existing techniques for registration to a multicast group, like IGMP or MLD.

The configuration of the network nodes is done via an information exchange interface between the broadcast management centre and the network nodes. The configuration is merely a part of information exchange done on said interface. Further information can be for example the requirements information regarding the Quality of Service QoS.

In a preferred embodiment of the invention it is foreseen to have an information exchange interface between broadcast capable server and broadcast management centre in order to support the broadcast management centre with information, for example about the building of the geographical broadcast group. For this purpose the server sends information about a geographical area, which could be interested in certain broadcast application.

The multicast technique on the transport layer uses a transport level multicast group tunnel, which is established by means of transport layer protocol for tunnelling. This means that for example in an IP switched network, which has two IP layers, the application IP layer and the transport IP layer as it is further described, the broadcast or multicast transmission performed on the application IP layer is mapped to the transport IP layer. This means currently the broadcast or multicast transmission is performed on the application IP layer. The invention proposes to redirect the broadcast or multicast transmission from the application IP layer to the transport IP layer. This can be done using a tunnel established on the transport IP layer for the certain multicast group by means of a transport layer protocol for tunnelling, which preferably can be the GPRS Tunnelling Protocol GTP.

In a preferred embodiment data delivery in the multicast part of the transmission is done using a multicast delivery tree, which can be established by means of existing multicast routing protocol.

It is advantageous to use the IP multicast, because of the existing delivery techniques, like for example the IP routing protocols using the IP packet header, in which the identifier of the multicast group is included.

The transmission of the broadcast data from the host to the user is done by means of a broadcast technique. In mobile networks this part of the transmission represents a radio interface. In a preferred embodiment of the invention the broadcast technique on the radio interface can be implemented by a broadcast bearer, delivering the same data to all users in one cell.

It is advantageous that the network nodes perform the mapping of the parts of the transmission in order to deliver the broadcast data. For example the broadcast data delivered from the broadcast capable server on a broadcast channel on the application IP layer are to be mapped in the first router to multicast channels built on the transport layer. Further mapping is to be performed in a further router, which sends the received multicast data over a further multicast channel, which is identified by another address. It can be also possible that a further router just forwards the received data. The mapping can results in adding or replacing the channels identifying addresses. It can also result in packet encapsulation.

In one embodiment, a broadcast management centre for broadcast and/or multicast management within a point-to-point oriented packet-switched telecommunication network is required for performing the invention. Said network is connected to a further network with a broadcast capable server and has network nodes comprising at least one router and at least one host serving at least one user. The broadcast management centre has a configuration unit for configuration of the network nodes to a geographical broadcast group. This unit is responsible for defining the network nodes and the required parameters in order to configure. The configuration is submitted to the defined nodes by means of a communication unit. The definition of the geographical broadcast group is based on the information received by a receiving unit. The information can be received from an operator or from the broadcast capable server via an interface between the said server and the broadcast management centre.

The invention presents also a router adapted to perform multicast in a point-to-point oriented packet-switched telecommunication network connected to a further network with a broadcast capable server. The said telecommunication network has network nodes comprising at least one of the said router and at least one host serving at least one user. The router has a configuration unit for configuration of the network nodes in order to provide geographical broadcast group. The configuration can be done either directly in the router or the configuration unit is also requested to configure further network nodes to a geographical broadcast group. The router has also a receiving unit for receiving data. The data can be either multicast data received from a previous router or broadcast data received from a broadcast capable server sitting on the further network. The received data is given to means for providing multicast techniques on the transport layer in order to multicast the data. A sending unit for sending the multicast data sends it towards the host belonging to the certain geographical broadcast group. It means it can be either a next router or a host.

In case the router has to adapt the received data for the further routing according to a data structure for the administration of the relation between the received data and the sent multicast data is to be provided.

Further the invention includes new functionality of a host. The host is to be adapted to perform broadcast in a point-to-point oriented packet-switched telecommunication network wherein the host is connected on one side to at least one router and on the other side to at least one user. The host has a receiving unit for receiving multicast data. This data is sent from the router using a multicast technique on the transport layer. After receiving the multicast data an association unit is used for establishment of association of the receiving data to the broadcast data, which are sent to the user. The host provides means for providing broadcast technique to the user. Depending on the interface to the user different broadcast techniques can be used. The data is sent to the user by means of a sending unit.

Further the invention discloses a system adapted to perform broadcast in a point-to-point oriented packet-switched telecommunication network connected to a further network with a broadcast capable server and said telecommunication network having network nodes comprising at least one router and at least one host serving at least one user. The system includes at least one router, at least one host, and a broadcast management centre with the new functionality as described above.

In the following a detailed description of the invention is given.

Figure 2:
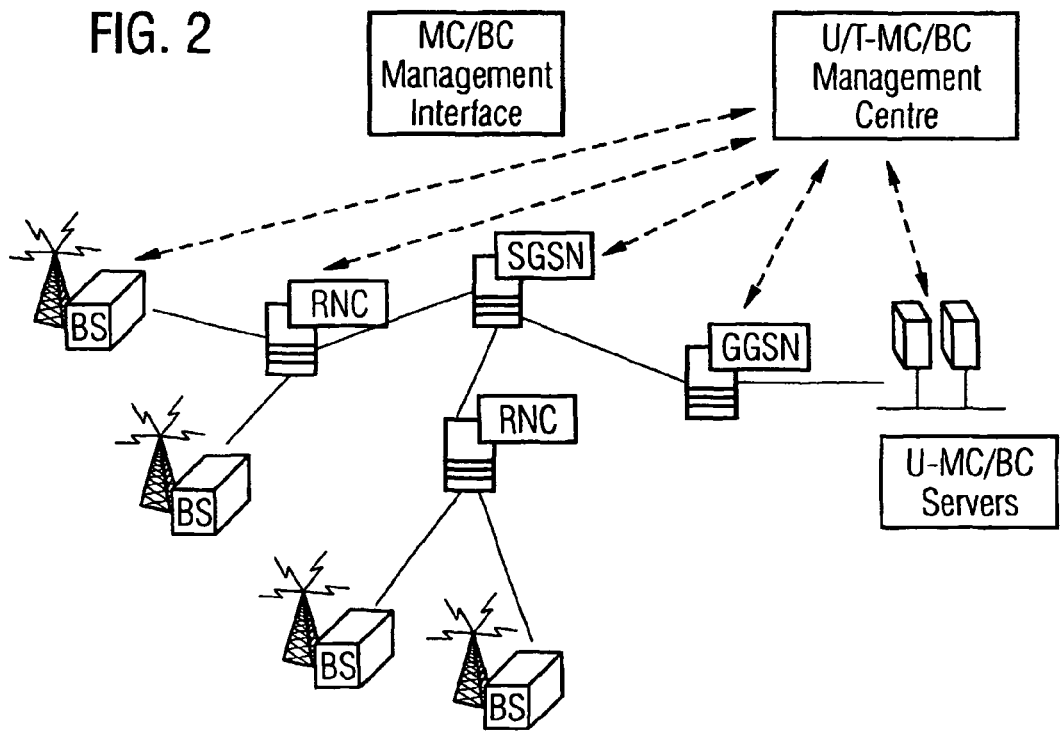
Figure 3:
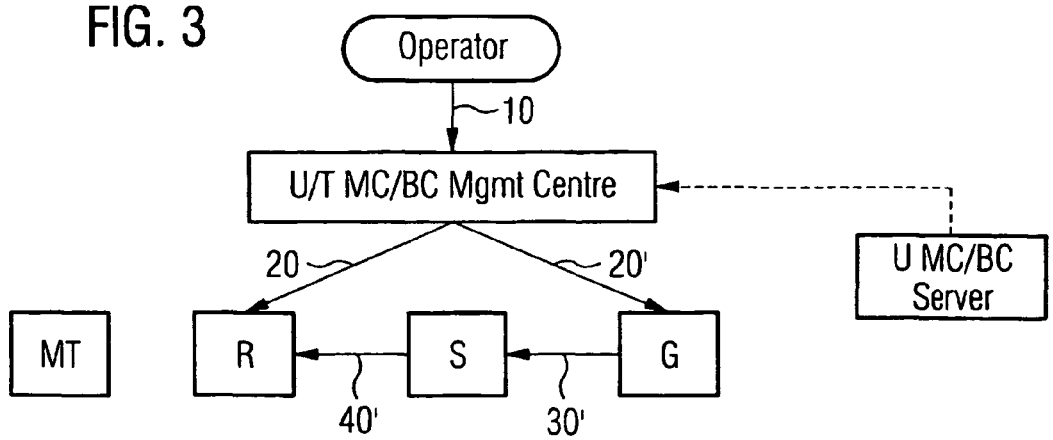
Figure 4:
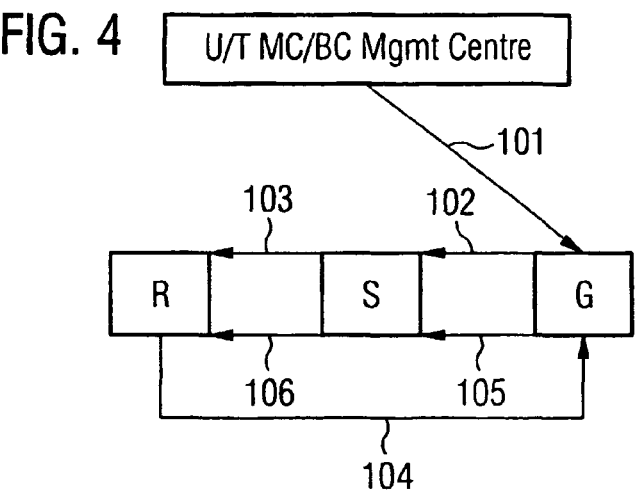
Figure 5:
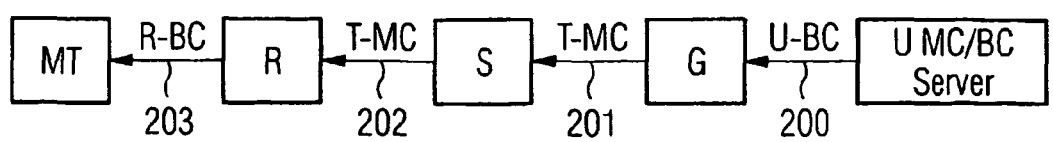

FIG. 1: GPRS protocol architecture,

FIG. 2: Relation of the network nodes according to the invention,

FIG. 3: Configuration of the network nodes according to the invention,

FIG. 4: Registration procedure,

FIG. 5: Broadcast data delivery procedure.

In the following the realisation of the multicast in a point-to-point oriented packet-switched telecommunication system is described.

The above-mentioned requirements and restriction for the functionality and communication manner of the introduced packet switched oriented nodes like SGSN or GGSN have their impact on the developed protocol stacks. As a result of the function of the GGSN as a router and as an interface to the external networks the IP layer below the application layer has been introduced. Further due to the restriction of having an IP network within the core network, it means between the GGSN and the SGSN and further to the RNC an IP layer has been introduced as a transport mean, below the application-specific tunnelling protocol.

The following description concentrates merely on the two IP layers in the packet switched domain in respect to FIG. 1. FIG. 1 shows an user, MS, which is connected over the Uu interface with an access network, UTRAN. This network communicates via the Iu-PS interface with a 3G-SGSN. The 3G-SGSN communicates over the Gn interface with 3G-GGSN. The Gi interface defines the interface to a further network, like for example Internet.

In respect to FIG. 1 there are two IP layers, depicted as IP, PPP and UDP/IP, in the following described as application IP and transport IP layer. The application IP layer is located directly below the application protocols, Applicat., in the protocol stack. The task of this IP layer is to connect the mobile station and the GGSN. This IP layer is transparent to the core network like for example the packet switching network. This is depicted in the FIG. 1 by a direct line going from the MS to the 3G-GGSN. The second IP layer is the transport IP layer used for transmission between the SGSN, GGSN and UTRAN. The payload traffic is transported across the Gn and Iu-PS encapsulated in an application-specific tunnelling protocol, the GPRS Tunnelling protocol GTP-U, which is an example of a transport layer protocol for tunnelling. GTP packets use UDP as transport protocol. However there are different tunnelling protocols, which are responsible for building a tunnel and GTP is merely an example. In the FIG. 1 the other protocols are mentioned due to the complementary reasons.

Regarding to the presented two IP layer architecture in the following a possible multicast technique on the transport layer is described.

The multicast technique uses a transport level multicast group tunnel TLMG, which is established by means of transport layer protocol for tunnelling like for example GTP Therefore in case of IP-multicast the idea is to map the multicast performed on the application IP layer to the transport IP layer. On the transport IP layer a GTP tunnel is established for a multicast group. The tunnel is identified so that a mapping between the arriving multicast data on the Gi interface to the GTP tunnel is guaranteed. The TLMG can be either established on demand, it means when the first multicast member registers to a multicast group or it can be pre-established in order to make to initialisation procedure faster. In the following a multicast member describes a network node, which is configured to be a member of a multicast group, which build a geographical broadcast group.

The establishment of a TLMG tunnel is done as following. At first the so-called PDP-Context activation is performed. The PDP context activation is like logging on the external IP network. For this aim a multicast member identity is associated with an IP address. During the PDP Context Activation a tunnel with an identity is created between the multicast member and the GGSN. During this procedure also Quality of Service QoS negotiation takes place. In order to register to a multicast group the multicast member sent an IGMP membership report message. In case the multi-cast group as indicated in the IGMP Membership Report does not exist in the GGSN yet, the GGSN creates a new entry for this. Additionally, the GGSN creates a Transport-Level-Multicast-Group TLMG on the transport IP layer for the multicast arriving on the application IP level. For this purpose the GGSN allocates a multicast address from the core network's address space. In the following it will be called the Multicast IP Address of the TLMG or alternative TLMG-MCAddress or simply TLMG address. In order to create the proper TLMG, the GGSN can take the negotiated Quality of Service QoS requirements from the PDP context into account.

The GGSN informs the corresponding nodes that it has mobile stations registering for a multicast group by means of enhanced GTP protocol as an example. A new GTP message, SGSN Membership Report Request can be used. It is also possible to use existing message, for example an enhanced Packet Data Unit PDU notification message on the UDP connection for this purpose.

The SGSN Membership Report Request message contains information required for the replication of the multicast stream into multiple unicast streams in the certain node, like for example the TLMG-MCAddress and the identification of the multicast member. Thus for the multicast group traffic the GGSN ignores the tunnel that is already established for that MS by the SGSN during the PDP context activation and uses TLMGs, which form a multicast delivery tree. This kind of multicast delivery tree will be called in the further description a TLMG delivery tree. With this method the to the GGSN over the Gi interface on the application IP arriving multicast data are redirected from the application IP layer to the transport IP layer, which performs the multicast in the core network using the TLMG delivery tree.

A deregistration from a multicast group is done by means of the IGMP and is requested by the broadcast management centre. For this purpose the multicast member sends an IGMP-Leave Message to the GGSN. The GGSN then can send a new GTP message to the multicast member to request the membership release. This message carries as parameter the TLMG MCAddress and the address of the multicast member. Also the GGSN removes the mobile station from the list for the corresponding multicast address or just decreases the corresponding counter. In case this multicast member was the only one registered for the multicast group then the TLMG is released from the TLMG delivery tree.

The described TLMG technique is only an example for performing a multicast technique. In the following the performing of broadcast in a point-to-point oriented packet-switched telecommunication network is described in more details using any possible multicast technique in the core network.

In the following the transmission of the broadcast or multicast data performed on the application IP layer will be called U-broadcast or U-multicast. In contrary to this the transmission on the transport IP layer will be called T-broadcast or T-multicast. Further the broadcast or multicast service on the radio bearer will be called R-broadcast or R-multicast. Due to the fact that the broadcast or multicast on each layer provides a service in the following it will be also called U-, T- or R-multicast or broadcast service. For example a U-broadcast service is a broadcast application provided by the broadcast capable server, a T-multicast service can be any multicast technique on the transport layer, which is provided by the network operator and a R-broadcast is any broadcast technique on the radio interface.

For the realisation of the invention additional new nodes or new features in the existing nodes are to be introduced. In the following the new features of a router, on the example of the GGSN, new features of a host, on the example of RNC/Node-B, new features of the broadcast capable router and broadcast management centre. In the following the broadcast capable router will be called Multicast/Broadcast Server or MC/BC server and the broadcast management centre will be called MC/BC Management Centre with the meaning that both nodes support also multicasting. The relation of the nodes is described in respect to FIG. 2.

FIG. 2 shows the geographical broadcast network architecture. The base stations BS are connected to the RNC. A SGSN administrates via the Iu-PS interface the RNCs and on the other side it is connected to the GGSN. The GGSN communicates via the Gi interface with a MC/BC Server. In FIG. 2 this server is depicted as U-MC/BC Server. The U/T-MC/BC Management Centre via an interface going to the involved network nodes administrates the whole architecture.

In the FIG. 2 this interface is depicted with the dotted line. They show that an U/T-MC/BC Management Centre can address all nodes within a network for example in order to perform the configuration. For the purpose of configuration messages in form of a request and of an acknowledgment message are exchanged between the U/T-MC/BC Management Centre and the corresponding nodes. In case there is a corresponding interface a communication to a U-MC/BC server can be performed.

In the following the enhanced functionality of the GGSN is described.

In order to fulfil the new tasks the GGSN has to act as a local multicast router, which is able to handle arriving IGMP messages. Usually the nodes register for specific multicast groups in the GGSN and the GGSN keeps track of the active multicast groups in the packet switched network.

Additionally, the GGSN creates multicast group in the scope of the network, it means from the GGSN towards the BTS. This multicast group can be for example the above-described Transport Level Multicast Group TLMG. The registration procedure is described further in more details.

Further the new functionality of a host is described. In case of UMTS the task of a host can be performed by a RNC in connection with BTS or Node-B.

If the SGSN is ordered to T-multicast a service, the SGSN orders the RNCs to T-Multicast and the RNCs in turn order the BTS's or Node-B's to R-broadcast the service. Node-B stores the received multicast or broadcast information and then either waits for the reception of the T-multicast data stream from the RNC or registers itself to the corresponding T-multicast delivery tree. The RNC/Node-B maps the incoming T-Multicast service to a R-broadcast service.

In addition to a packet switched network and the nodes of the network, U-MC/BC servers, a corresponding U/T-MC/BC Management Centre, and an U/T-MC/BC Management Interface are needed.

In the following the U/T-MC/BC Management Centre is described.

The U/T MC/BC Management Centre is used to configure the T-multicast and R-broadcast services in the PLMN regarding to the requested U-service. The U/T MC/BC Management Centre may have an interface to the U-MC/BC Servers in order to retrieve and send information about the U-MC/BC service to be used for the T- and R-MC/BC service management and configuration in the PLMN. The information to be retrieved from the MC/BC server can be for example the multicast address of U-MC/BC service, such that the GGSN can register itself to the corresponding multicast group using this multicast address, and the required QoS for the U-MC/BC service. Further the MC/BC server may send to the U/T MC/BC Management Centre the specification of the geographical area for a certain U-BC Service.

The task of the U/T MC/BC Management Centre can be also fulfilled by any other node, which has the above-mentioned functionality.

In the following the U-MC/BC server is described.

The U-MC/BC server contains and provides the U-broadcast service to the wireless subscribers in the PLMN. Said server is usually located in the further network, like for example the Internet und it does not have any information about the structure of the connected networks. The U-MC/BC server merely knows there is a network with at least one user, which wants to receive the broadcast information. The transmission is performed on the application IP layer, therefore the prefix U-. However, also a U-multicast service or a U-unicast service in the Internet can be used to provide a geographical U-broadcast service in the PLMN if the U-multicast/unicast service is handled in the GGSN like an U-broadcast service. The difference is anyhow not visible to the end user within the PLMN.

Regarding to the introduced nomenclature and the introduced function of the existing or new nodes the basic idea of the present invention is therefore to introduce an efficient architectural solution for providing U-broadcast services to all subscribers that are able and willing to receive the service in a specific geographical area of the PLMN. The U-broadcast service provisioning involves a U-broadcast server, a T-multicast technique in the fixed infrastructure, which builds the core network, and of a R-broadcast technique on the radio interface. The U-broadcast service is support by a U/T-MC/BC management centre.

In the following a preferred embodiment of the invention is given. It describes the configuration of the geographical areas.

Geographical U-broadcast services apply to the area covered by a BTS/Node-B, RNC, SGSN, GGSN or the whole PLMN it means consisting of nodes in the distributing tree starting with the GGSN in the PLMN. Operators use the U/T-MC/BC Management Centre to configure one or more nodes in the PLMN for the U-broadcast service provisioning. Another possibility for configuration is triggered by the MC/BC-server. It means the configuration is based on the parameters retrieved from the U-MC/BC-server. This solution is to be applied, when there is an interface between the MC/BC-server and the U/T-MC/BC Management Centre.

The U/T-MC/BC Management Centre performs the configuration of a node in the PLMN. This can be performed either directly or indirectly via any of the nodes higher up in the hierarchy. In the first alternative the U/T-MC/BC Management Centre orders a node to become part of a PLMN T-multicast group. It means the U/T-MC/BC Management Centre configures the BTS's and/or Node-B's directly to become part of the multicast group. This is done with registration done by means of an IGMP as it is described below. The direct configuration of the BTS requires that the nodes higher up in the hierarchy get informed about the configuration in order to deliver the broadcast data towards the BTS as it is described in the broadcast data delivery procedure.

In the second solution the U/T-MC/BC Management Centre configures an intermediate node, like for example a SGSN and the SGSN is responsible for establishment of connection towards the BTS or B-Nodes. The establishment of connection can be based on a multicast delivery tree. For this purpose the nodes, which are to be connected, are requested to register to the multicast group. The address of the multicast group is sent with the request message. The for the connection establishment addressed node is also advised by the U/T-MC/BC Management Centre for the size of the multicast group, this means for the nodes, which are to be connected. For example the U/T-MC/BC Management Centre can configure an SGSN that should T-multicast a specific service in the whole coverage area. The configuration can contain any description from a simple configuration like the whole area up to more complex configurations like for example the whole area except RNC-4.

Although it is possible to let the packet-switched network node determine on its own the corresponding nodes from input such as areas between certain geographical coordinates, the logic to determine the network nodes for the T-multicast should generally reside in the U/T-MC/BC Management Centre.

The multicast group registration of the nodes, which are addressed to connect, is done by means of multicast group management mechanisms such as IGMP or MLD as it is described below.

In the following the configuration procedure is presented in respect to FIG. 3.

The FIG. 3 includes the following nodes, the U/T-MC/BC Management Centre depicted as U/T-MC/BC Mgmt Centre, the U MC/BC Server, a gateway G, like for example a GGSN, a serving node in between S, like for example an SGSN, an edge node R, like a BTS and a mobile station MT. The configuration can be either started by 30 the operator 10, or in case an interface to the MC/BC server exists by the said server, 10'. The operator has to make it manually in contrast to the configuration via the interface to the MC/BC server, which makes it automatically. With this operation, the U/T-MC/BC Management Centre gets the information about the size of the multicast group with the belonging nodes. In the next step, the U/T-MC/BC Management Centre can either make the configuration of the multicast group directly, 20 addressing the edge nodes 5 directly or indirectly via the nodes higher in the architecture, 20'. In respect to FIG. 3, the U/T-MC/BC Management Centre sends a message, 20' to the gateway G. which takes care of establishment of connection, 30' and 40' towards the mobile station MT.

Of course more then one T-multicast group can exists in a network.

In the following a preferred embodiment of the invention is given. It describes the registration procedure.

In case a BTS or Node-B is ordered to R-broadcast a T-Multicast service in the corresponding geographical area, the BTS or Node-B receives the T-multicast address for the U-broadcast service and the required QoS. The U/T-MC/BC Management Centre can provide additional information in order to be used for the registration to the T-multicast group. Due to the fact that each node has information about all corresponding lower-level nodes in the hierarchy, instead of ordering each lower level node by means of a dedicated unicast message, a general configuration multicast group can be used to address all lower level nodes. The BTS or Node-B stores the received multicast information and registers itself to the corresponding T-multicast delivery tree. This can be done in case of an IP transport network by means of IGMP/MLD and results in a T-multicast delivery tree with the BTS or Node-B as leaf of the tree. The registration message can be either send directly to the root of the tree or to the next nodes, which forwards the message towards the root.

In the following an embodiment of the registration procedure is disclosed in respect to FIG. 4. The FIG. 4 shows an example for registration, when a gateway is ordered 101 to establish connections to the nodes belonging to the certain geographical area. For this purpose the gateway G sends a request message to the concerned nodes using the hierarchical principle 102, 103. In order to register to a multicast group the edge node, R sends an IGMP message to the gateway G 104 upon the multicast delivery tree for T-multicast is established from the gateway to the edge nodes R, which are the leafs of the tree, 105, 106. The multicast delivery tree for T-Multicast can be for example based on the above-described TLMGs. In this case after retrieving the IGMP message a TLMG is built from the GGSN, which is an example of a gateway G towards the BTS, which are an example for edge node R. The GGSN can address the BTS directly or it can build a TLMG to the SGSN, which is an example for serving node S, and instructs the SGSN to build up a TLMG to the BTS. In fact a source based multicast tree is created between the GGSN and all affected nodes in order to provide T-multicast service. It is also possible to have pre-configured TLMGs, which are pre-established with a certain QoS parameters.

In the following a preferred embodiment of the invention is given. It describes the broadcast delivery procedure in respect to FIG. 5. The FIG. 5 includes same nodes as in to FIG. 3.

In the first step, the MC/BC server sends the broadcast data to the gateway G, 200. The broadcast data is sent via defined broadcast channels. The gateway G is configured in the way that it knows 30 which broadcast channels corresponds to which T-multicast deliver tree within the network. For this purpose, the gateway G may administrate a mapping table for mapping the broadcast channels existing on the interface to the MC/BC server to the multicast channels in a multicast tree existing in the core network. The gateway G redirects the broadcast data from the user layer, like for example the application IP layer, to the transport layer, like for example the transport IP layer, which is used to multicast the 5 data by means of a T-multicast deliver tree like the TLMG, 201, 202. The intermediate nodes, S after receiving the T-multicast data either simply forward it to the neighbouring nodes or for additional processing for the data is made, like for example further capsulation. The data is sent by means of T-multicast 10 technique, until the edge node, R is reached. In generic description, in case a higher-level node in the PLAN has to T-multicast a service in the corresponding geographical area, the node orders all corresponding lower-level nodes to T-multicast the service. It means in case an SGSN is ordered to T-multicast a 15 service, the SGSN orders the RNCs to T-multicast. Preferably IP multicast is used to deliver the data to the edge nodes R. The edge node R makes a mapping from the T-multicast to R-broadcast and broadcasts the data to the users (MTs), 203.

Additional information can optionally be provided to the users in the corresponding geographical area in order to inform these about the U-broadcast service and the corresponding contents. This U-broadcast service information is kept in the U-MC/BC servers but might be updated from the U/T-MC/BC management centre. It means the U-broadcast service information can be sent on a pre-configured default U-BC stream, which is known by all terminals, like for example a videotext. The distribution of the U-broadcast service information can be also a task of the U-MC/BC server, which informs the end user terminals about the availability of a service. This might be achieved by sending information about the availability and the details of the retrieval of the program via an available data transmission service, like for example SMS, USSD, WAP or a Session Announcement Protocol.

The information about the broadcast service availability is sent preferably to those nodes, which belong to a certain geographical area. The configuration can be either performed, when the network is booted up and the broadcast service is adapted to the configuration or the network is configured on demand, it means when a new broadcast service is supported a configuration of the network is performed. In the last case it is preferably to use the interface between the broadcast capable server and the broadcast management centre.

The solution covered in this invention focuses on the packet switched domain in GSM or UMTS network. In general, the idea can be applied whenever tunnelling is used, such as with GTP, L2TP, IPSec, Mobile IP, etc. Therefore the invention can be applied to any networks with two IP layers, it means an application IP layer and a transport IP layer. Also for case where the transport layer is based on another technology that supports multicast transmission like for example ATM with multicast enhancements the mechanisms can be applied.

The invention claimed is:

1. A method for broadcasting messages in a point-to-point oriented packet-switched telecommunication network, said network having a set of network nodes comprising a first router and at least one host serving at least one user, wherein the first router communicates with a broadcast capable server that provides broadcast data, said method comprising the steps of:
   receiving, at said broadcast management center, information about the building of a geographical broadcast group interested in certain broadcast data;
   configuring the network nodes by said broadcast management centre for broadcast provisioning within said geographical broadcast group, said broadcast management centre ordering the network nodes to register to the geographical broadcast group;
   sending, from said broadcast capable server, the broadcast data to the first router;
   using multicast techniques on the transport layer to route the broadcast data from the first router to the at least one host belonging to the geographical broadcast group; and
   using a broadcast technique to send the broadcast data from said host to the at least one user.

2. The method according to claim 1, wherein the geographical broadcast group is defined as a geographical area of a Public Land Mobile Network (PLMN).

3. The method according to claim 1, wherein said step of configuring performed by the broadcast management centre comprises the step of directly addressing the network nodes belonging to the geographical broadcast group.

4. The method according to claim 1, wherein said step of configuring performed by the broadcast management centre is performed indirectly such that a network node is addressed to establish connection to the further network nodes building the geographical broadcast group.

5. The method according to claim 3, further comprising the step of requesting the network nodes to register to the geographical broadcast group.

6. The method according claim 5 wherein the indication for registration is performed by means of Internet Group Message Protocol (IGMP) or Multicast Listener Discovery (MLD) protocol.

7. The method according to claim 1, wherein said step of configuring comprises the exchange of information via an interface between the broadcast management centre and the network nodes.

8. The method according to claim 1, wherein the broadcast capable server supports the broadcast management centre by means of an information exchange interface between broadcast capable server and the broadcast management centre.

9. The method according to claim 1, wherein the multicast technique on the transport layer uses a transport level multicast group tunnel, which is established by means of transport layer protocol for tunnelling.

10. The method according to claim 9, wherein the transport layer protocol for tunnelling is a GPRS Tunneling Protocol (GTP).

11. The method according to claim 1, wherein multicast data delivery is performed using a multicast delivery tree established by means of multicast routing protocol.

12. The method according to claim 1, wherein the multicast is an IP-multicast.

13. The method according to claim 1, wherein the broadcast technique comprises the broadcast technique provided on a radio interface with said at least one user.

14. The method according to claim 1, further comprising the step of mapping parts of the transmission in the involved network nodes in order to deliver the broadcast data to the at least one user.

* * * * *

UNITED STATES PATENT AND TRADEMARK OFFICE
CERTIFICATE OF CORRECTION

| | | |
|---|---|---|
| PATENT NO. | : 7,792,105 B2 | Page 1 of 1 |
| APPLICATION NO. | : 10/497581 | |
| DATED | : September 7, 2010 | |
| INVENTOR(S) | : Keller et al. | |

It is certified that error appears in the above-identified patent and that said Letters Patent is hereby corrected as shown below:

In Column 4, Line 39, delete "Nordrheinwestfalen" and insert -- Nordrhein-Westfalen --, therefor.

In Column 11, Line 18, after "by" delete "30".

In Column 11, Line 27, after "nodes" delete "5".

In Column 11, Line 30, delete "G." and insert -- G, --, therefor.

In Column 12, Line 16, after "knows" delete "30".

In Column 12, Line 24, after "the" delete "5".

In Column 12, Line 30, delete "10 technique," and insert -- technique, --, therefor.

In Column 12, Line 31, delete "PLAN" and insert -- PLMN --, therefor.

In Column 12, Line 35, after "a" delete "15".

In Column 14, Line 7, in Claim 6, delete "according claim 5" and insert -- according to claim 5, --, therefor.

Signed and Sealed this
Twenty-second Day of March, 2011

David J. Kappos
*Director of the United States Patent and Trademark Office*